US006602576B2

(12) United States Patent
Naoe et al.

(10) Patent No.: US 6,602,576 B2
(45) Date of Patent: Aug. 5, 2003

(54) MAGNETIC RECORDING MEDIUM

(75) Inventors: Koji Naoe, Kanagawa (JP); Kiyomi Ejiri, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 81 days.

(21) Appl. No.: 09/798,807

(22) Filed: Mar. 2, 2001

(65) Prior Publication Data

US 2001/0044037 A1 Nov. 22, 2001

(30) Foreign Application Priority Data

Mar. 7, 2000 (JP) ........................................ 2000-062191

(51) Int. Cl.$^7$ ................................................ G11B 5/66
(52) U.S. Cl. .................. 428/141; 428/212; 428/216; 428/336; 428/425.9; 428/694 BS; 428/694 BA; 428/900
(58) Field of Search ................................ 428/141, 212, 428/216, 336, 425.9, 694 BS, 694 BA, 900

(56) References Cited

U.S. PATENT DOCUMENTS 5,804,283 A * 9/1998 Inaba et al. .................. 428/141

FOREIGN PATENT DOCUMENTS

| EP | 0 520 155 A2 | 12/1992 |
| EP | 0566100 A1 * | 4/1993 |
| EP | 0 566 100 A1 | 10/1993 |
| EP | 0732688 A2 * | 9/1996 |
| EP | 0865034 A1 * | 9/1998 |

* cited by examiner

Primary Examiner—Leszek Kiliman
(74) Attorney, Agent, or Firm—Stroock & Stroock & Lavan LLP

(57) ABSTRACT

The present invention aims to provide a magnetic recording medium for digital recording/reproducing systems having a small bit area, i.e. a short recording wavelength and a narrow track width, which is a particulate magnetic recording medium showing good electromagnetic characteristics.

A magnetic recording medium comprising a nonmagnetic layer containing a nonmagnetic powder and a binder and a magnetic layer containing a ferromagnetic powder and a binder provided in this order on a nonmagnetic substrate wherein said magnetic layer has an average thickness of 0.01–0.1 μm and the ratio of the area of magnetic recording defects generated upon magnetic development after recording at the shortest recording wavelength to the total magnetic recording area is 0.2–20%.

18 Claims, No Drawings

MAGNETIC RECORDING MEDIUM

BACKGROUND OF THE INVENTION

1. Field of the Invention

The present invention relates to a magnetic recording medium, particularly high-density magnetic recording media for recording/reproducing systems having a small bit area, i.e. a short recording wavelength and a narrow track width.

2. Description of Related Art

Particulate magnetic recording media comprising a magnetic layer consisting of a powder of ferromagnetic iron oxide, Co-modified ferromagnetic iron oxide, $CrO_2$, ferromagnetic alloy or the like dispersed in a binder applied on a nonmagnetic substrate have widely been used as magnetic recording media such as video tapes, audio tapes, magnetic disks or the like. Recently, there is a tendency toward shorter recording wavelength with higher densification, resulting in the aggravation of the problems of self-demagnetization loss during recording leading to output loss with thick magnetic layers and thickness loss during reproducing. Thus, thinner magnetic layers have been made. However, magnetic layers having a small thickness of about 2 $\mu$m or less are susceptible to the influence of the nonmagnetic substrate on their surfaces to deteriorate electromagnetic characteristics or aggravate dropouts.

As a possible solution to this problem, simultaneous multilayer coating was proposed and commercialized wherein a nonmagnetic layer is applied on a substrate and a thin layer of a concentrated magnetic coating solution is applied thereon to form a magnetic layer (JP-A Nos. 191315/88 and 187418/88). These inventions dramatically improved the yield of particulate magnetic recording media to attain good electromagnetic characteristics. However, there is a demand for magnetic media having a further higher density.

High densification was generally achieved by reducing the bit area, i.e. shortening the recording wavelength and narrowing the track width. However, both means of shortening the recording wavelength and narrowing the track width invite an output loss to make it difficult to ensure C/N. In recent tape systems, attempts were made to ensure C/N in the case of shortening the recording wavelength or narrowing the track width by adopting a laminated head or MR head to achieve a high output.

In order to provide a magnetic recording medium compatible for high densification, attempts were made to further reduce the thickness of the magnetic layer or to enhance the dispersivity of the ferromagnetic powder. However, it was found that as the recording wavelength becomes shorter, the ferromagnetic powder in the form of a rod or loop larger than the bit length aggregates to develop magnetic pinholes (defects of magnetic development).

It was also found that thin magnetic layers of 0.1 $\mu$m or less involve magnetic layer defects, i.e. the powder of the lower layer is partially exposed or magnetic pinholes appear as a result of the presence of nonmagnetic materials (solid lubricants such as carbon blacks or abrasives such as alumina) or spaces occurring in the surroundings.

The presence of such magnetic pinholes invited a fluctuation in bit amplitude due to noise increase or output loss, leading to an increase in error rate.

It is an object of the present invention to provide a magnetic recording medium for digital recording/reproducing systems having a small bit area, i.e. a short recording wavelength and a narrow track width, which is a particulate medium showing good electromagnetic characteristics.

SUMMARY OF THE INVENTION

As a result of careful studies of the structures or magnetic characteristics of magnetic and nonmagnetic layers to solve the above problems, we succeeded in preparing a magnetic recording medium showing good electromagnetic characteristics in MR heads as described below.

Accordingly, the present invention provides a magnetic recording medium comprising a nonmagnetic layer comprising a nonmagnetic powder and a binder and a magnetic layer comprising a ferromagnetic powder and a binder provided in this order on a nonmagnetic substrate wherein said magnetic layer has an average thickness of 0.01–0.1 $\mu$m and a ratio of a magnetic recording defects area to a total magnetic recording area is in the range of from 0.2 to 20% in a case recording is made at the shortest wavelength in a recording system.

In the present invention, said ferromagnetic powder is preferably a ferromagnetic metal alloy powder having a major axis length of 0.1 $\mu$m or less and an average particle volume of 25000 $nm^3$ or less.

DESCRIPTION OF THE PREFERRED EMBODIMENTS

When used with an MR head tested herein, the magnetic layer preferably has a thickness in the range defined above with $\phi r$ (residual magnetic flux) being 50–250 G. $\mu$m from the viewpoint of narrowing the half width (PW50) without inducing saturation. However, the lower limit of $\phi r$ is defined to ensure output.

In magnetic recording media of the present invention, the magnetic layer has an average thickness of 0.01–0.1 $\mu$m. If the average thickness of the magnetic layer is less than 0.01 $\mu$m, the average number of ferromagnetic powder particles in the thickness direction is one or less. That is, the area of defects in the magnetic layer increases to cause a marked output loss. If the average thickness of the magnetic layer exceeds 0.1 $\mu$m, PW50 (the pulse width at 50% of the peak of an isolated reproducing wave) increases to lower high-density recording characteristics.

When a magnetic recording medium having a magnetic layer based on a ferromagnetic metal alloy powder is used for reproducing in a system using an MR head, the MR head is saturated by various factors of the MR head (saturated magnetic flux density and thickness of the MR head and saturated magnetic flux density and thickness of the SAL film) to lower C/N if the Br (residual magnetic flux density) is 0.25 T or more.

The magnetic layer preferably has an average thickness of 0.02–0.08 $\mu$m.

For example, the following methods can be used to reduce the thickness of the magnetic layer to 0.1 $\mu$m or less.

(1) A method of forming a nonmagnetic layer and a magnetic layer by simultaneous multilayer coating on a nonmagnetic substrate is adopted while decreasing the amount of binders in both magnetic and nonmagnetic layers with the binder amount in the magnetic layer <the binder amount in the nonmagnetic layer. In addition, the solid contents in the magnetic coating solution and the nonmagnetic coating solution are lowered. The reduction of binder amounts and solid contents in the coating solutions suppresses elastic behaviors of the magnetic and nonmagnetic solutions and prevents repulsion of the solutions immediately after coating die slot during high-speed coating to attain a thin magnetic layer.

(2) In addition, the thixotropy of the nonmagnetic solution can be increased to inhibit turbulence at the interface between the magnetic layer and the nonmagnetic layer due to the above reduction of solids. In this case, the amount of carbon blacks on the nonmagnetic layer formulation can be increased or the nature or particle diameter of the main nonmagnetic powder in the nonmagnetic layer can be selected to lower the viscosity under high shearing while increasing the viscosity under low shearing.

If the thickness of the magnetic layer is simply reduced to 0.1 $\mu$m or less, however, the magnetic particle density varies to increase noise and lower C/N because of failures caused by defects in the magnetic layer even by simultaneous multilayer coating. Therefore, the present invention defined that the ratio of the magnetic recording defects area to the total magnetic recording area (hereinafter may be referred to as the area ratio of magnetic development defects) is 0.2–20%. Provided that the area ratio of magnetic development defects to be considered in this invention is that estimated in a case recording is made at the shortest wavelength in a recording system. The magnetic recording defects area is recognizable upon magnetic development as illustrated in Example and from the results, the area ratio can be obtained by comparison with the total magnetic recording area.

If the area ratio of magnetic defects is less than 0.2%, the area of non-magnetic materials such as solid lubricants or abrasives present in the magnetic layer exposed to the magnetic layer is too small to ensure running durability. If it exceeds 20%, not only noise increases but also output loss occurs. This output loss invites a fluctuation in beat amplitude to increase error rate.

The area ratio of magnetic development defects is preferably in the range of 0.5–15%, more preferably 0.5–10%.

In order to inhibit magnetic layer defects or aggregation of magnetic materials and limit the area ratio of magnetic development defects in a specific range, the following methods can be used, for example.

(1) Magnetic layer defects can be inhibited by using magnetic materials in the form of fine particles and reducing the amount of binders to increase the thixotropy of the magnetic solution (magnetic layer coating solution) However, it is preferable to control the coater to apply Higher shearing in a slit and a feed pipe immediately before the coating die slot to prevent cohesion of the solution and lower the viscosity at the exit of the coating die slot, whereby increasing the wettability to the nonmagnetic solution to improve the adhesion of the magnetic layer on the nonmagnetic layer.

(2) Magnetic layer defects resulting from abrasives/carbon particles during coating/drying can be reduced by optimizing coating/drying conditions, especially drying conditions in oriented regions. Such magnetic layer defects are more likely to occur when the magnetic solution has a low viscosity under low shearing and high orientation is applied with a highly orientable magnetic material, and they tend to be more prominent when the magnetic layer is thin. As the viscosity under low shearing decreases, magnetic pinholes (magnetic development defects) also occur as a result of aggregation of magnetic particles rather than nonmagnetic materials as before. This type of magnetic pinholes (magnetic development defects) can be overcome by increasing the viscosity under low shearing of the magnetic solution while weakening the initial orientation magnetic field (for example, an orientation magnetic field parallel to the magnetic layer plane formed by at least a pair of magnets (preferably permanent magnets) with like poles (south or north poles) facing each other).

(3) Separately from the magnetic solution, abrasives are prepared into a paste and highly dispersed with zirconia beads and mixed with the magnetic solution immediately before coating, and the mixture is dispersed with zirconia beads for a short period (15–30 minutes) to prepare a magnetic coating solution. Thus, secondary particles of the abrasives can be reduced and magnetic layer defects caused by abrasive particles and the spaces around them can be reduced.

Thus, the present invention attained the above object of the present invention by a particulate magnetic recording medium having a thin magnetic layer and an area ratio of magnetic development defects in a specific range so that the variation in magnetic particle density is decreased.

In magnetic recording media of the present invention, said ferromagnetic powder is preferably a ferromagnetic metal alloy powder having a major axis length of 0.1 $\mu$m or less and an average particle volume of 25000 nm$^3$ or less. The ferromagnetic powder having a major axis length of 0.1 $\mu$m or less is advantageous in ensuring the reproducing output during recording at a short recording wavelength of 0.33 nm or less. The major axis length L of the ferromagnetic powder is preferably 0.04–0.1 $\mu$m, more preferably 0.04–0.08 $\mu$m.

In systems using an MR head as a reproducing head, the ferromagnetic powder having an average particle volume of 25000 nm$^3$ or less is advantageous in improving the magnetic particle density with reduced noise, improved output and improved C/N. The average particle volume of the ferromagnetic powder is preferably 12000 nm$^3$ or less. The lower limit of the average particle volume is about 3000 nm$^3$, for example, from the viewpoint that the ferromagnetic metal powder can retain magnetism.

Moreover, the ferromagnetic powder having the major axis length and average particle volume as defined above is preferably a ferromagnetic metal alloy powder from the viewpoint that the wave shape distortion in the isolated reproducing wave is small and the load of wave shape correction in equalization is low.

Also in the present invention, the ferromagnetic powder preferably consists of flat acicular magnetic particles to increase the number of magnetic particles present in the thickness direction of the magnetic layer so that the variation in the number of magnetic particles in the thickness direction of the thin magnetic layer is restrained.

The ferromagnetic powder preferably has a crystallite size Dx (metal fraction size) determined by X-ray diffraction of 0.008–0.015 $\mu$m, preferably 0.008–0.0125 $\mu$m in order to limit the particle volume and retain magnetism. The ferromagnetic powder preferably has an iron oxide coating thickness SL determined by X-ray diffraction of 0.0005–0.003 $\mu$m, preferably 0.0005–0.001 $\mu$m in respect of preservability and $\sigma$S (retention of magnetism).

When the ferromagnetic metal powder had a circular section perpendicular to the direction of the major axis, the volume of the magnetic material was calculated from a virtual cylinder model as follows:

$$\text{Volume of magnetic material } V=4/3\pi(a/2)^3+\pi(a/2)^2 \times L$$

where a is the minor axis length.

When the ferromagnetic metal powder had an ellipsoidal section perpendicular to the direction of the major axis, the volume of the magnetic material was calculated from a virtual ellipsoidal cylinder model as follows:

Volume of magnetic material $V=4/3\pi(a/2)(b/2)^2+\pi(a/2)(b/2)\times L$ where a is the major axis length and b is the minor axis length of the ellipsoidal section.

In magnetic recording media of the present invention, the volume ratio of the magnetic material in the magnetic layer is preferably raised to 40% or more to increase the magnetic particle density in the magnetic layer. The volume ratio can be adjusted at the above range by lowering the amount of compounds which adsorb the surfaces of binders or magnetic particles in the magnetic layer to improve the dispersivity of the magnetic particles in the binders (dispersants). The magnetic particle density in the magnetic layer is preferably in the range of 40–60%. The upper limit is defined to ensure running durability.

When an MR head is used as a reproducing head, the Bm (magnetic flux density) of the magnetic layer of the present invention is suitably 0.2–0.6 T, preferably 0.25–0.5 T from the viewpoint of attaining a high output and noise reduction by increasing magnetic particles. The Bm of 0.3 T or less can be attained by lowering the as (saturation magnetization) of the magnetic material rather than lowering the volume ratio of the magnetic material in the magnetic layer. The SQ (squareness) of the magnetic layer is suitably in the range of 0.7–0.95, preferably 0.8–0.95 in order to ensure the output.

When an MR head is used as a reproducing head, the magnetic layer suitably has a Br (residual magnetic flux density) in the range of 0.15–0.55 T, preferably 0.2–0.45 T for the same reason as for Bm and an Hc (coercivity) in the range of 143–239 KA/m, preferably 159–223 KA/m in order to inhibit demagnetizing field, with a high Hc being especially preferred.

Methods for decreasing the amount of binders to increase the volume ratio of magnetic materials in the magnetic layer are specifically explained.

A polyurethane resin may be contained preferably in an amount of 50–100% by weight, more preferably 70–100% by weight based on the total binder resins in the magnetic layer, and the binder resins may be used preferably in a total amount of 5–18% by weight, more preferably 5–12% by weight based on the ferromagnetic metal powder in the magnetic layer.

Said polyurethane resin preferably consists of the reaction product of a diol and an organic diisocyanate as main materials wherein the diol component contains a short-chain diol having a cyclic structure and a long-chain diol having an ether group. This polyurethane resin is preferably a binder containing 17–40% by weight of a short-chain diol having a cyclic structure in the polyurethane resin and 10–50% by weight of a long-chain diol containing 1.0–5.0 mmol/g of an ether group based on the entire polyurethane resin in the polyurethane resin.

The short-chain diol having a cyclic structure means a diol having a saturated or unsaturated cyclic structure and having a molecular weight of less than 500. For example, preferred are diols having an aromatic or aliyclic groups such as bisphenol A, hydrogenated bisphenol A represented by formula 1 below, bisphenol S, bisphenol P and their ethylene oxide and propylene oxide adducts, cyclohexane dimethanol, cyclohexane diol, etc.

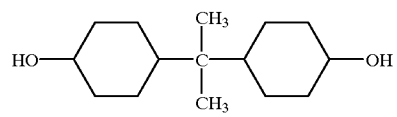

(1)

More preferred are hydrogenated bisphenol A represented by formula 1 and its ethylene oxide and propylene oxide adducts.

The short-chain diol having a cyclic structure is normally selected from those having a molecular weight of 50 or more to less than 500. Said short-chain diol having a cyclic structure can be normally used in combination with other diols having a molecular weight of less than 500, specifically including straight or branched diols such as ethylene glycol, 1,3-propylenediol, 1,2-propylene glycol, 1,4-butanediol, 1,5-pentanediol, 1,6-hexanediol, 2,2-dimethylpropanediol, 1,8-octanediol, 1,9-nonanediol, diethylene glycol, ethylene oxide or propylene oxide adducts of N-diethanol amine.

By using them, a coating film having a high strength, high Tg and high durability is obtained by their cyclic structure. The introduction of branched $CH_3$ allows high dispersivity because of the excellent solubility in solvents. The content of the short-chain diol in the polyurethane resin is preferably 17–40% by weight, more preferably 20–30% by weight.

The long-chain diol means a diol having a molecular weight of 500 or more, specifically including adducts of bisphenol A, hydrogenated bisphenol A, bisphenol S or bisphenol P with ethylene oxide, propylene oxide or both, preferably polypropylene glycol, polyethylene glycol, polytetramethylene blycol, with compounds represented formula 2 below being especially preferred.

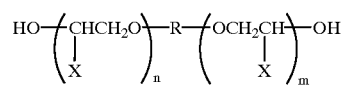

(2)

wherein R represents at least one of:

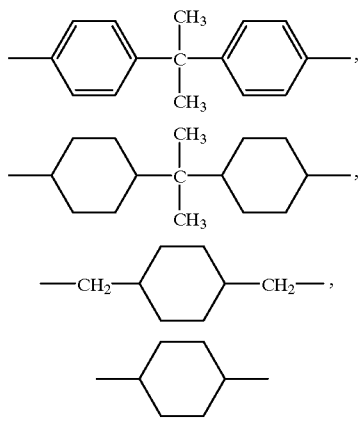

and n and m are desirably 3–24. In the long-chain diols, R preferably represents ① or ② below:

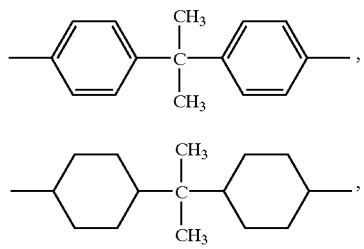

with ① being more preferred. In the long-chain diols of formula 2 above, preferably represents a hydrogen atom or a methyl group, more preferably a methyl group. X in the parentheses multiplied by n or m may not be identical, but may represent a hydrogen atom and a methyl group in admixture. Polyurethane resins used in especially preferred embodiments of the present invention have a high coating strength and an excellent durability because of the cyclic structure while they have an excellent dispersivity with high solubility in solvents because of the branched $CH_3$ of propylene.

The weight average molecular weight (Mw) of the long-chain diol is normally selected in the range of 500–5000, preferably 700–3000. The content of the long-chain diol having an ether group is preferably 10–50% by weight, more preferably 30–40% by weight in the polyurethane resin. The content of the ether group in said long-chain diol unit is preferably 1.0–5.0 mmol/g, more preferably 2.0–4.0 mmol/g in the polyurethane resin.

The polyurethane resin has a number average molecular weight (Mn) of preferably 18000–56000, more preferably 23000–34000 and a weight average molecular weight (Mw) of preferably 30000–100000, more preferably 40000–60000.

The glass transition temperature Tg of the polyurethane resin is normally in the range of 0–200° C., preferably 30–150° C., more preferably 30–130° C.

The above polyurethane resin may be used in combination with synthetic resins such as vinyl chloride resins, but a higher proportion of the urethane resin is effective for restraining the unevenness or variation of the thickness of the magnetic layer during coating and drying because the surface tension of the magnetic solution can be lowered.

Preferably, said polyurethane resin is also incorporated into the nonmagnetic layer.

In order to further improve separation with less amounts of binders, an aromatic organic acid compound which improves the surface of the ferromagnetic metal powder (dispersant) can be contained in the magnetic layer at a level of preferably 0.1–0.8 mol, more preferably 0.2–0.5 mol per kg of the ferromagnetic metal powder.

The aromatic organic acid compound preferably strongly absorbs various powders including at least ferromagnetic metal powders and has a high affinity for polyurethane resins. Therefore, the aromatic organic acid compound preferably has a dissociation constant as high as possible (strong acid), and suitable are organic acids having a pKa of 3 or less or salts thereof.

The aromatic organic acid compound is a concept including not only free acids but also their salts or derivatives such as esters. The adsorption to powder mentioned above is a concept including not only physical adsorption but also chemical adsorption including covalent bonds. Organic acids having a pKa of 3 or less include α-naphthylphosphoric acid, phenylphosphoric acid, diphenylphosphoric acid, p-ethylbenzenephosphonic acid, phenylphosphonic acid, phenylphosphinic acid, methanesulfonic acid, benzenesulfonic acid, p-toluenesulfonic acid, naphthalene-α-sulfonic acid, naththalene-β-sulfonic acid or their salts.

The aromatic organic acid compound can be used in any manner so far as the above characteristics are achieved, but preferably it is added with the ferromagnetic metal powder and the binder when they are kneaded during the preparation of a coating or the ferromagnetic metal powder is surface-treated with the aromatic organic acid compound before the ferromagnetic metal powder is kneaded with the binder. Preferably, such an aromatic organic acid compound is also contained in the lower layer normally in the range of 0.1–0.5 mol, preferably 0.1–0.35 mol per kg of the nonmagnetic inorganic powder.

In order to improve the thixotropy of the lower nonmagnetic solution while ensuring dispersivity, the amount of binder resins (including hardeners) in the lower layer is preferably 14–25 parts by weight, more preferably 14–20 parts by weight per 100 parts by weight of the total amount of the nonmagnetic inorganic powder. When the proportion of carbon blacks or the like is increased to improve the thixotropy of the solution, it is preferable to incorporate an urethane resin consisting of a short-chain diol having a cyclic structure and a long-chain diol having an ether group as described above from the viewpoint of ensuring dispersivity. However, the binder in the lower nonmagnetic layer is preferably based on a vinyl chloride resin from the viewpoint of enhancing the surface tension of the lower layer nonmagnetic solution to inhibit turbulence at the upper/lower layer interface or thickness variation.

In the present invention, the standard deviation σ of the thickness of the magnetic layer is preferably 0.03 μm or less. The magnetic layer thickness variation $\sigma/d_{AVE}$ obtained by dividing the standard deviation σ by the average magnetic layer thickness $d_{AVE}$ is 0.5 or less, preferably 0.3 or less, more preferably 0.2 or less. Such value of σ can be attained by known means in addition to the above means.

In the case of multilayer structures, the average thickness d and the standard deviation σ of the thickness of the magnetic layer represent the values determined by the method below. In case where the magnetic layer is a single-layer, a similar method applies. Each magnetic recording medium is cut out along the longitudinal direction with a diamond cutter into a sample of approximately 0.1 μm in thickness, which is then observed and photographed under a transmission electron microscope at a magnification of 10,000× to 100,000×, preferably 50,000× to 100,000×. The photograph is printed in A4 to A5 sizes. Then, the interface between the magnetic layer and the lower layer is visually determined from the difference of the shape of the ferromagnetic metal powder and the nonmagnetic inorganic powder and marked in black, and the surface of the magnetic layer is also marked in black. Then, the lengths of the marking lines are measured with an image processor IBAS2 manufactured by Zeiss Co., Ltd. For a 21 cm-long photograph of the sample, 85 to 300 measurements are made. The average d is calculated from these measurements to determine the standard deviation σ by the following equation.

$$\sigma = [\{(d_1-d)^2 + (d_2-d)^2 + \ldots + (d_n-d)^2\}/(n-1)]^{1/2}$$

where $d_1, d_2, \ldots d_n$ represent individual measurements, and n represents 85 to 300.

The maximum of each measurement of the magnetic layer thickness is preferably in the range of about 1.0–3 times d. The minimum of each measurement of the magnetic layer thickness is preferably in the range of about 0.4–1 times d.

Magnetic recording media of the present invention are explained further in detail below.

The ferromagnetic metal alloy powder is preferably an alloy based on Fe or Fe—Co in the form of a flat acicular particle prepared by the process described in JP-A No. 340805/98. The related description of this publication is incorporated herein by reference.

Fine particles are preferably formed at the goethite stage by incorporating other atoms than Fe—Co such as Al, Y and increasing the atomic weight ratio of Y. A magnetic material having a small particle volume variation can be prepared by selecting a high reduction temperature to shorten the treatment.

Then, the lower layer of the present invention is described in detail.

Nonmagnetic inorganic powders used in the lower layer of the present invention may be selected from inorganic compounds such as metal oxides, metal carbonates, metal sulfates, metal nitrides, metal carbides and metal sulfides. Suitable inorganic compounds include, for example, α-alumina having an α-conversion degree of 90% or more, β-alumina, γ-alumina, θ-alumina, silicon carbide, chromium oxide, cerium oxide, α-iron oxide, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate and molybdenum disulfide, which can be used alone or in combination. Especially preferred are titanium dioxide, zinc oxide, iron oxide and barium sulfate, among which titanium dioxide and α-iron oxide are more preferred.

These nonmagnetic inorganic powders preferably have a particle size of 3 μm or less, but the same effect can be obtained by combining nonmagnetic inorganic powders having different particle sizes or by widening the particle diameter distribution of even a single nonmagnetic inorganic powder, if necessary. Especially preferred nonmagnetic inorganic powders have a particle size of 0.01 μm to 0.2 μm. Particularly when nonmagnetic inorganic powders are particulate metal oxides, the average particle size is preferably 0.08 μm or less. Acicular metal oxides preferably have a major axis length of 0.3 μm or less, more preferably 0.2 μm or less. The particle size of nonmagnetic inorganic powders is determined in the same manner as described above for ferromagnetic metal powders. The tap density is 0.05–2 g/ml, preferably 0.2–1.5 g/ml. The moisture content of nonmagnetic inorganic powders is 0.1–5% by weight, preferably 0.2–3% by weight, more preferably 0.3–1.5% by weight. The pH of nonmagnetic inorganic powders is 2–11, most preferably 7–10. The specific surface area of nonmagnetic inorganic powders is 1–100 m$^2$/g, preferably 5–70 m$^2$/g, more preferably 10–65 m$^2$/g. The crystallite size of nonmagnetic inorganic powders is preferably 0.004 μm–1 μm, more preferably 0.04 μm–0.1 μm. The oil absorption utilizing dibutyl phthalate (DBP) is 5–100 ml/100 g, preferably 10–80 ml/100 g, more preferably 20–60 ml/100 g. The specific gravity is 1–12, preferably 3–6. They may have any of acicular, spherical, polygonal and plate-like shapes.

It is considered that ignition loss is preferably 20% by weight or less, most preferably zero. The aforementioned nonmagnetic inorganic powders used in the present invention preferably have a Mohs hardness of 4 or more but 10 or less. The roughness factor of the surfaces of these powders is preferably 0.8–1.5, more preferably 0.9–1.2. The SA (stearic acid) absorption of nonmagnetic inorganic powders is 1–20 μmol/m$^2$, more preferably 2–15 μmol/m$^2$. The wetting heat of nonmagnetic inorganic powders in water at 25° C. is preferably in the range of 200 erg/cm$^2$–600 erg/cm$^2$. Suitable solvents also have this wetting heat range. Suitably, 1 to 10 water molecules/100 angstroms are present on the surface at 100–400° C. The pH of the isoelectric point in water is preferably between 3 and 9.

These nonmagnetic inorganic powders preferably have $Al_2O_3$, $SiO_2$, $TiO_2$, $ZrO_2$, $SnO_2$, $Sb_2O_3$ or ZnO on their surfaces by surface treatment. Especially preferred for dispersibility are $Al_2O_3$, $SiO_2$, $TiO_2$ and $ZrO_2$, more preferably $Al_2O_3$, $SiO_2$ and $ZrO_2$. These may be used in combination or alone to form a surface-coating layer by coprecipitation or depositing alumina at first on the surfaces of the powders and then silica or vice versa depending on the purpose. The surface-coating layer may be porous for some purposes, but preferably homogeneous and dense in general.

Specific examples of nonmagnetic inorganic powders used in the lower layer of the present invention include Nanotite manufactured by Showa Denko K. K.; HIT-100 and ZA-G1 manufactured by Sumitomo Chemical Co. Ltd.; DPN-250, DPN-250BX, DPN-245, DPN-270BX, DPB-550BX and DPN-550RX manufactured by Toda Kogyo Corp.; titanium oxide TTO-51B, TTO-55A, TTO-55B, TTO-55C, TTO-55S, TTO-55D, SN-100, MJ-7 α-iron oxide E270, E271 and E300 manufactured by Ishihara Sangyo Kaisha, Ltd.; STT-4D, STT-30D, STT-30 and STT-65C manufactured by Titan Kogyo K. K.; MT-100S, MT-100T, MT-150W, MT-500B, MT-600B, MT-100F and MT-500HD manufactured by Tayca Corporation; FINEX-25, BF-1, BF-10, BF-20 and ST-M manufactured by Sakai Chemical Industry Co., Ltd.; DEFIC-Y and DEFIC-R manufactured by Dowa Mining Co., Ltd.; AS2BM and TiO2P25 manufactured by Nippon Aerosil Co., Ltd.; 100A and 500A manufactured by Ube Industries, Ltd.; and Y-LOP manufactured by Titan Kogyo K. K.; as well as sintered products thereof.

Especially preferred nonmagnetic inorganic powders are titanium dioxide and α-iron oxide. The α-iron oxide (hematite) is prepared under the following conditions. α-$Fe_2O_3$ powders are prepared via precursor acicular goethite particles obtained by: (1) an oxidation reaction in which a suspension containing a ferrous hydroxide colloid obtained by adding an equivalent amount or more of an aqueous alkali hydroxide solution to an aqueous ferrous solution is bubbled with an oxygen-containing gas at pH 11 or higher and a temperature of 80° C. or less to generate acicular goethite particles; (2) an oxidation reaction in which a suspension containing $FeCO_3$ obtained by reacting an aqueous ferrous salt solution with an aqueous alkali carbonate solution is bubbled with an oxygen-containing gas to generate spindle-like goethite particles; (3) an oxidation reaction in which an aqueous ferrous salt solution containing a ferrous hydroxide colloid obtained by adding less than an equivalent amount of an aqueous alkali hydroxide solution or an aqueous alkali carbonate solution to an aqueous ferrous solution is bubbled with an oxygen-containing gas to generate acicular goethite nuclear particles, and then an aqueous alkali hydroxide solution is added to said aqueous ferrous salt solution containing said acicular goethite nuclear particles in an amount equivalent or more to $Fe^{2+}$ in said aqueous ferrous salt solution and then the mixed solution is bubbled with an oxygen-containing gas to grow said acicular goethite nuclear particles; or (4) an oxidation reaction in which an aqueous ferrous salt solution containing a ferrous hydroxide colloid obtained by adding less than an equivalent amount of an aqueous alkali hydroxide solution or an aqueous alkali carbonate solution to an aqueous ferrous solution is bubbled with an oxygen-containing gas to generate acicular goethite nuclear particles, which are then grown in an acid or a neutral zone.

Heterogeneous elements such as Ni, Zn, P or Si commonly added to improve characteristics of granulated powders or the like may be added during the generation reaction of goethite particles without any inconvenience. Precursor acicular goethite particles are dehydrated at a temperature range of 200–500° C. and, if necessary, annealed by heat treatment at a temperature range of 350–800° C. to give acicular $\alpha$-$Fe_2O_3$ particles.

An anti-sintering agent containing P, Si, B, Zr, Sb or the like may be deposited on the surfaces of acicular goethite particles to be dehydrated or annealed without any inconvenience. Annealing involves heat treatment at a temperature range of 350–800° C. because it is preferred that voids on the surfaces of acicular $\alpha$-$Fe_2O_3$ particles obtained after dehydration should be filled with the outermost surfaces of the particles molten by annealing to provide a smooth surface profile.

Said acicular $\alpha$-$Fe_2O_3$ particles obtained by hydration or annealing are dispersed in an aqueous solution to give a suspension, which is combined with an Al compound, for example, and pH-adjusted and coated with said additive compound on the surfaces of said $\alpha$-$Fe_2O_3$ particles followed by filtration, rinsing, drying, grinding and, if necessary, further deaeration and compaction or the like. Suitable Al compounds are aluminum salts such as aluminum acetate, aluminum sulfate, aluminum chloride or aluminum nitrate, and alkali aluminates such as sodium aluminate. The amount of Al compounds added here is normally 0.01–50% by weight expressed as Al on the basis of $\alpha$-$Fe_2O_3$ particle powder. In addition to Al compounds, one or more members selected from Si compounds or P, Ti, Mn, Ni, Zn, Zr, Sn and Sb compounds may also be used for coating. The amount of each of these compounds added in combination with the Al compound is normally in the range of 0.01–50% by weight on the basis of $\alpha$-$Fe_2O_3$ particle powder.

Titanium dioxide is prepared by the following processes. These processes mainly include the sulfate process and the chlorine process. The sulfate process comprises digesting ilmenite base ore with sulfuric acid to extract Ti, Fe and the like as sulfates. Iron sulfate is crystallized out, and the remaining titanyl sulfate solution is purified by filtration and then thermally hydrolyzed to precipitate hydrous titanium oxide. After washing the precipitates by filtration, contaminant impurities are washed off and then particle diameter modifiers or the like are added. Then, the material is baked at 800–1000° C. to give crude titanium oxide. The crude titanium oxide may be rutile type or anatase type depending on the nature of the nucleating agent added during hydrolysis. The crude titanium oxide is worked up by crashing, granulation, surface treatments or the like. The chlorine process uses natural rutile or synthetic rutile as base ore. The ore is chlorinated under a high-temperature reducing condition to convert Ti into $TiCl_4$ and Fe into $FeCl_2$ and the iron oxide solidified by cooling is separated from liquid $TiCl_4$. Thus obtained crude $TiCl_4$ is refined by rectification, and then combined with a nucleating agent and instantaneously reacted with oxygen at a temperature of 100° C. or more to give crude titanium oxide. The crude titanium oxide generated in this oxidative decomposition step is worked up to confer pigment-like properties in the same manner as described for the sulfate process.

In advance of surface treatments, said titanium oxide stock is dry-ground and then wet-ground with water and dispersants, and then coarse particles are screened out by centrifugation. Then, a fine slurry is transferred to a surface treatment vessel, where metal hydroxides are coated on the particle surfaces. First, a predetermined amount of an aqueous solution of a salt of Al, Si, Ti, Zr, Sb, Sn, Zn or the like is added, and then an acid or alkali for neutralizing the solution is added to coat the resulting hydrous oxide on the surfaces of titanium oxide particles. The by-product water-soluble salts are removed by decantation, filtration and washing, and finally, the pH of the slurry is adjusted and the slurry is filtered and washed with pure water. The washed cake is then dried with a spray drier or a band drier. Finally, this dried material is ground by a jet mill into a product. Surface treatments are not limited to the use of aqueous systems, but vapors of $AlCl_3$, $SiCl_4$ may be passed through titanium oxide powder and then water vapor may be introduced. As for other processes for preparing pigments, see G. D. Parfitt and K. S. W. Sing: "Characterization of Powder Surfaces", Academic Press, 1976. The related description of this publication is incorporated herein by reference.

Carbon blacks can be mixed into the lower layer to attain not only known effects such as a low Rs or a low light transmittance but also a desired Micro-Vickers hardness.

The Micro-Vickers hardness of the lower layer is normally 25–60 $Kg/mm^2$, preferably 30–50 $Kg/mm^2$ as measured with a thin film durometer HMA-400 manufactured by NEC using a triangular pyramid indenter point made of diamond having a ridge angle of 80° and a point radius of 0.1 $\mu$m. The light transmittance is generally standardized at an infrared absorption at a wavelength around 900 nm of 3% or less, e.g., 0.8% or less for VHS. Suitable carbon blacks for this purpose include furnace blacks for rubber use, thermal blacks for rubber use, carbon blacks for coloring agents, acetylene blacks or the like.

Carbon blacks used in the lower layer have a specific surface area of, normally 100–500 $m^2$/g, preferably 150–400 $m^2$/g and a DBP oil absorption of, normally 20–400 ml/100 g, preferably 30–200 ml/100 g. The particle size of carbon blacks is normally 5 $\mu$m–80 $\mu$m, preferably 5–20 $\mu$m. Generally, carbon black preferably have a pH of 2–10, a moisture content of 0.1–10%, and a tap density of 0.1–1 g/ml. Specific examples of carbon blacks used in the present invention include BLACK PEARLS 2000, 1300, 1000, 900, 800, 880, 700 and VULCAN XC-72 manufactured by Cabot Corporation; #3050B, 3150B, 3250B, #3750B, #3950B, #950, #650B, #970B, #850B and MA-600 manufactured by Mitsubishi Chemical Corporation; CONDUCTEX SC, RAVEN 8800, 8000, 7000, 5750, 5250, 3500, 2100, 2000, 1800, 1500, 1255 and 1250 manufactured by Columbian Chemicals Company; and Ketjen Black EC manufactured by Akzo Nobel. These carbon blacks may be surface-treated with a dispersant or grafted with a resin or partially graphitized on their surfaces. Alternatively, they may be dispersed in a binder before they are added to a coating. These carbon blacks can be used in the range not exceeding 50% by weight of said nonmagnetic inorganic powders and not exceeding 40% by weight of the total weight of the nonmagnetic layer. These carbon blacks can be used alone or in combination.

As for carbon blacks that can be used in the lower layer, see "Carbon Black Handbook" edited by Carbon Black Association, for example. The related description of this publication is incorporated herein by reference. The lower layer may also contain organic powders for some purposes. Such organic powders include acrylic-styrene resin powders, benzoguanamine resin powders, melamine resin powders and phthalocyanine pigments as well as polyolefin resin powders, polyester resin powders, polyamide resin powders, polyimide resin powders and polyfluoroethylene resins, which can be prepared by the processes described in JP-A Nos. 18564/87 and 255827/85. The related description of this publication is incorporated herein by reference.

Magnetic recording media generally have an undercoat layer consisting of a solvent-soluble polyester in order to improve the adhesion between the substrate and the magnetic layer or the lower layer. It generally has a thickness of 0.5 μm or less.

Suitable polyisocyanates for use in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidinediisocyanate, isophorone diisocyanate, triphenylmethane triisocyanate; products of these isocyanates with polyalcohols; or polyisocyanates producted by condensation of isocyanates. These isocyanates are commercially available under trade names Coronate L, Coronate HL, Coronate 2030, Coronate 2031, Millionate MR and Millionate MTL from Nippon Polyurethane Industry Co. Ltd.; Takenate D-102, Takenate D-100N, Takenate D-200 and Takenate D-202 from Takeda Chemical Industries, Ltd.; Desmodule L, Desmodule IL, Desmodule N and Desmodule HL from Sumitomo Bayer Urethane Co., Ltd. etc., which may be used alone or as a combination of two or more by taking advantage of the difference in curing reactivity in both lower and upper layers. These polyisocyanates are used normally in the range of 0–50% by weight, preferably 0–30% by weight on the basis of the total weight of binder resins in the upper layer or normally in the range of 0–40% by weight, preferably 0–25% by weight on the basis of the total weight of binder resins in the lower layer.

When magnetic recording media of the present invention consist of two or more layers, it is a matter of course that the amount of binder resins, the amounts of vinyl chloride resins, polyurethane resins, polyisocyanates or other resins in binders, the molecular weight of each resin forming magnetic layers, the amount of polar groups or the aforementioned physical properties of resins or other factors can vary from lower to upper layers, if necessary, by applying known techniques relating to multilayer magnetic systems.

Carbon blacks used in magnetic layers of the present invention may be those mentioned for nonmagnetic layers. Carbon blacks may be dispersed in a binder before they are added to a magnetic coating. These carbon blacks can be used alone or in combination. When a carbon black is used, it preferably represents 0.1–10% by weight, preferably 0.1–3% by weight, more preferably 0.5–1.5% by weight of the amount of ferromagnetic metal powders. Carbon blacks have an antistatic effect, friction coefficient-lowering effect, light protection-conferring effect, film strength-improving effect or the like on magnetic layers depending on the carbon blacks specifically used. Therefore, these carbon blacks used in the present invention can obviously vary in nature, amount and combination from upper to lower layers to meet the purpose on the basis of the characteristics shown above such as particle size, oil absorption, conductivity or pH. As for carbon blacks that can be used in magnetic layers of the present invention, see "Carbon Black Handbook" edited by Carbon Black Association, for example. The related description of this publication is incorporated herein by reference.

Suitable abrasives for use in the present invention are typically known materials having a Mohs hardness of 6 or more such as α-alumina having an α-conversion degree of 90% or more, β-alumina, silicon carbide, chromium oxide, cerium oxide, α-iron oxide, corundum, artificial diamond, silicon nitride, silicon carbide, titanium carbide, titanium dioxide, silicon dioxide and boron nitride, which can be used alone or in combination. Complexes of these abrasives may also be used (which are obtained by surface-treating one abrasive with another abrasive). These abrasives may sometimes contain other compounds or elements than main components, but the effect is not affected so far as main components represent 90% by weight or more. These abrasives preferably have an average particle size of 0.01–2 μm, but the same effect can be obtained by combining abrasives having different particle sizes or by widening the particle diameter distribution of even a single abrasive, if necessary. Abrasives preferably have a tap density of 0.3–2 g/cc, a moisture content of 0.1–5%, a pH of 2–11 and a specific surface area of 1–30 $m^2/g$.

Abrasives used in the present invention may have any of acicular, spherical and cubic shapes, but preferably have a partially angular shape to provide high abrasive properties. Specific examples of abrasives used in the present invention include HIT-60A, HIT-70, HIT-80, HIT-80G and HIT-100 manufactured by Sumitomo Chemical Co., Ltd.; and Mypolex 1/10UG, Mypolex 1/8UG manufactured by DuPont. Abrasives used in the present invention can obviously vary in nature, amount and combination from upper to lower layers to meet the purpose. These abrasives may be preliminarily dispersed in a binder before they are added into a magnetic coating. Abrasives are preferably present at a ratio of 5 particles/100 $\mu m^2$ or more on the surface of the magnetic layer and the end face of the magnetic layer of magnetic recording media of the present invention.

Additives used in the present invention have a lubricating effect, antistatic effect, dispersing effect, plasticizing effect or the like. Suitable additives include molybdenum disulfide; tungsten-graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphate esters and alkali metal salts thereof; alkyl sulfate esters and alkali metal salts thereof; polyphenyl ethers; fluorine-containing alkylsulfate esters and alkali metal salts thereof; C10–24 monobasic fatty acids optionally branched and optionally containing an unsaturated bond and metal (e.g., Li, Na, K, Cu) salts thereof; C12–22 monohydric, dihydric, trihydric, tetrahydric, pentahydric and hexahydric alcohols optionally branched and optionally containing an unsaturated bond; C12–22 alkoxy alcohols optionally branched and optionally containing an unsaturated bond; monofatty acid esters or difatty acid esters or trifatty acid esters formed from a C10–24 monobasic fatty acid optionally branched and optionally containing an unsaturated bond and any one of C2–12 monohydric, dihydric, trihydric, tetrahydric, pentahydric and hexahydric alcohols optionally branched and optionally containing an unsaturated bond; fatty acid esters of monoalkyl ethers of alkylene oxide polymers; C8–22 fatty acid amides; and C8–22 aliphatic amines.

Specific examples of these additives include lauric acid, myristic acid, palmitic acid, stearic acid, behenic acid, butyl stearate, oleic acid, linolic acid, linolenic acid, elaidic acid, octyl stearate, amyl stearate, iso-octyl stearate, octyl myristate, butoxyethyl stearate, anhydrosorbitan monostearate, anhydrosorbitan distearate, anhydrosorbitan tristearate, oleyl alcohol, and lauryl alcohol. Other suitable additives include nonionic surfactants based on alkylene oxides, glycerin, glycidol or alkyl phenol-ethylene oxide adducts; cationic surfactants based on cyclic amines, ester amides, quaternary ammonium salts, hydantoin derivatives, heterocycles, phosphonium or sulfoniums; anionic surfactants containing an acidic group such as carboxylate, sulfonate, phosphate, sulfate ester and phosphate ester groups; and ampholytic surfactants based on amino acids, amino sulfonic acids, sulfate or phosphonate esters of amino alcohols or alkyl betaines.

These surfactants are described in detail in "Surfactants Handbook" (published by Sangyo Tosho Co., Ltd.). The related description of this publication is incorporated herein by reference. These lubricants, antistatic agents or the like need not be 100% pure but may contain impurities such as isomers, unreacted materials, side reaction products, decomposition products and oxides in addition to main components. The content of these impurities is preferably 30% or less, more preferably 10% or less.

These lubricants and surfactants used in the present invention can vary in nature and amount from lower to magnetic layers, if desired. For examples, fatty acids having different melting points or esters having different boiling points or polarities can be used in lower and magnetic layers to control bleed-through, or the amount of surfactants can be controlled to improve coating stability, or the amount of lubricants added to the lower layer can be increased to improve a lubricating effect, though these examples are not limitative as a matter of course.

Additives used in the present invention may be totally or partially added in any step of the preparation process of magnetic coatings. For example, they may be mixed with ferromagnetic metal powders before kneading, or may be added during the step where ferromagnetic metal powders, binders and solvents are kneaded, or may be added during or after dispersion, or may be added immediately before coating. For some purposes, additives may be partially or totally applied by simultaneous or sequential coating after magnetic coating layers have been applied. For other purposes, lubricants may be applied on the surfaces of magnetic layers after completion of calendering or slitting.

Commercial products of these lubricants used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Hydrogenated Castor Oil Fatty Acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, Butyl Stearate, Butyl Laurate and Erucic Acid manufactured by NOF Corporation; Oleic Acid manufactured by Kanto Chemical Co., Ltd.; FAL-205 and FAL-123 manufactured by Takemoto Oil & Fat Co., Ltd.; NJLUB LO, NJLUB IPM and Sansosyzer E4030 manufactured by New Japan Chemical Co., Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935 manufactured by Shin-Etsu Chemical Co., Ltd.; Armid P, Armid C and Armoslip CP manufactured by Lion Armour Co., Ltd.; Duomine TDO manufactured by Lion Corporation; BA-41G manufactured by Nisshin Oil Mills, Ltd.; Profan 2012E, Newpol PE61, Ionet MS-400, Ionet MO-200, Ionet DL-200, Ionet DS-300, Ionet DS-1000 and Ionet DO-200 manufactured by Sanyo Chemical Industries, Ltd.

Organic solvents used in the present invention include ketones such as acetone, methyl ethyl ketone, methyl isobutyl ketone, diisobutyl ketone, cyclohexanone, isophorone and tetrahydrofuran; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide; dimethylacetamide; and hexane. These organic solvents need not be 100% pure but may contain impurities such as isomers, unreacted materials, side reaction products, decomposition products, oxides and moisture in addition to main components. The content of these impurities is preferably 30% or less, more preferably 10% or less. Organic solvents used in the present invention are preferably the same type in the magnetic and lower layers, but may be added in varying amounts. A solvent having a high surface tension such as cyclohexane or dioxane is used in the lower layer to increase coating stability, more specifically, it is important that the arithmetic mean of solvent compositions in the upper layer is not less than the arithmetic mean of solvent compositions in the lower layer. Somewhat high polarity is preferred to improve dispersibility, so that solvent compositions preferably contain 50% or more of solvents having a permittivity of 15 or more but 20 or less. The dissolution parameter is preferably 8–11.

Magnetic recording media of the present invention have the following thickness structure. The present invention is suitable for substrates having a thickness of 1–100 $\mu$m, but especially effective for thin substrates of 1–8 $\mu$m. The sum of the thicknesses of the magnetic and lower layers is in the range of $\frac{1}{100}$ to twice of the thickness of the substrate. An adhesive layer is preferably inserted between the substrate and the lower layer to improve adhesion.

The adhesive layer has a thickness of 0.01–2 $\mu$m, preferably 0.02–0.5 $\mu$m. A back coat layer may be provided on the side of the substrate opposite to the magnetic layer. The back coat layer has a thickness of 0.1–2 $\mu$m, preferably 0.3–1.0 $\mu$m. Known materials can be used for these adhesive layer and back coat layer. Substrates used in the present invention have a Micro-Vickers hardness of 75 Kg/mm$^2$ or more and include known films such as biaxially oriented polyethylene naphthalates, polyamides, polyimides, polyamideimides, aromatic polyamides, polybenzoxydazoles. Especially preferred substrates consist of an aromatic polyamide or polyethylene naphthalate available as "Aramid" from Toray Industries, Inc. or "Aramica" from Asahi Chemical Industry Co., Ltd.

These substrates may be preliminarily subjected to corona discharge treatment, plasma treatment, adhesion-enhancing treatment, heat treatment, dust removal or the like. In order to achieve the objects of the present invention, the face of substrates on which the magnetic layer is applied preferably has a center-line average surface roughness of 10 nm or less but 0.1 nm or more, preferably 6 nm or less but 0.2 nm or more, more preferably 4 nm or less but 0.5 nm or more. Preferably, these substrates not only have a small center-line average surface roughness but also are free from large projections of 1 $\mu$m or more. The surface roughness profile can be freely controlled by changing the size and amount of fillers added to substrates. Examples of these fillers include oxides or carbonates of Al, Ca, Si, Ti or the like whether crystalline or amorphous and acrylic or melamine organic fine powders. In order to ensure running durability at the same time, the face on which aback coat layer is applied is preferably rougher than the face on which the magnetic layer is applied. The face on which a back coat layer is applied preferably has a center-line average surface roughness of 1 nm or more but 20 nm or less, more preferably 2 nm or more but 8 nm or less. The roughness cay vary from the face on which the magnetic layer is applied to the face on which the back coat layer is applied by using a dual-structure substrate or providing a coating layer.

Substrates used in the present invention preferably have an F-5 value of 10–50 Kg/mm$^2$ in the tape running direction and an F-5 value of 10–30 Kg/mm$^2$ in the tape width direction, with the F-5 value in the tape longitudinal direction being typically higher than the F-5 value in the tape width direction though this is not limitative especially when the strength in the width direction should be increased. The thermal shrinkage of substrates in the tape running direction and width direction is preferably 3% or less, more preferably 1.5% or less at 100° C. for 30 minutes, or preferably 1% or less, more preferably 0.5% or less at 80° C. for 30 minutes. Preferably, the break strength in both directions is 5–100 kg/mm$^2$, and the modulus is 100–2,000 kg/mm$^2$. The light transmittance at 900 nm herein is preferably 30% or less, more preferably 3% or less.

The process for preparing magnetic coatings of magnetic recording media of the present invention comprises at least a kneading step, a dispersing step and a mixing step optionally inserted before or after the former steps. Each step may be separated into two or more stages.

Materials used in the present invention such as binders, antistatic agents, lubricants and solvents may be added at the beginning or in the course of any steps. Moreover, divided portions of each material may be added in two or more steps. For example, divided portions of a polyurethane resin may be added at the kneading step, the dispersing step, and the mixing step for controlling viscosity after dispersion. In order to achieve the objects of the present invention, carbon blacks or abrasives can be dispersed separately from magnetic metal powder and mixed together just before coating to prevent cohesion of magnetic materials and control the height of projections of carbon and abrasives on the surface of the magnetic layer. Solutions for magnetic or nonmagnetic layers or dispersions of abrasives are desirably prepared with dispersion media having a high specific gravity, preferably zirconia beads.

The following structures can be proposed as examples of the apparatus and method for applying a multilayer magnetic recording medium of the present invention by simultaneous multiple coating.

1) The lower layer is initially applied using a coater commonly used for magnetic coating such as gravure coater, roller coater, blade coater or extrusion coater, and the upper layer is then applied using a substrate-pressurizing extrusion coater disclosed in JP-B No. 46186/89 and JP-A Nos. 238179/85 and 265672/90 while the lower layer is still wet. The related descriptions of these publications are incorporated herein by reference.

2) The upper and lower layers are applied almost simultaneously using a single coating head having two slits for passing coating solutions as disclosed in JP-A Nos. 88080/88, 17971/90 and 265672/90. The related descriptions of these publications are incorporated herein by reference.

3) The upper and lower layers are applied almost simultaneously using an extrusion coater having back-up rolls as disclosed in JP-A No. 174965/90. The related description of this publication is incorporated herein by reference.

In order to prevent electromagnetic characteristics loss or the like of magnetic recording media due to aggregation of magnetic particles, coating solutions in the coating head should desirably be subjected to shearing by the method as disclosed in JP-A Nos. 95174/87 and 236968/89. The related descriptions of these publications are incorporated herein by reference. As for the viscosity of coating solutions, magnetic solutions preferably have a viscosity of 300 cps or more at shear rate D500 [1/S] and a viscosity of 7.5–12 cps at 45000 [1/S]. Nonmagnetic solutions preferably have a viscosity of 200 cps or more at shear rate D500 [1/S] and a viscosity of 14 cps or less at 45000 [1/S].

In order to obtain a magnetic recording medium of the present invention, strong orientation is preferably applied. Magnetic tapes are longitudinally oriented preferably with a magnetic field generated by a combination of a solenoid of 0.1 T or more, preferably 0.3 T or more and a cobalt magnet of 0.2 T or more, preferably 0.25 T or more with like poles facing each other, and a mild drying step is preferably added before orientation to prevent high orientation at an early drying stage. Floppy disks are subjected to random orientation under orientation conditions involving orientation in the tape longitudinal direction similarly to magnetic tapes, and then passing through an alternating field generator having two magnetic field strengths such as 250 G at frequency 50 Hz and 120 G at frequency 50 Hz.

Before the nonmagnetic layer and the magnetic layer are applied by simultaneous multiple coating, known adhesion-enhancing treatments are preferably combined, including application of an adhesive layer based on a polymer, corona discharge, UV irradiation or electron beam irradiation. Calendering may also be performed with calendaring rolls such as heat-resistant plastic roll made of epoxy, polyimide, polyamide, polyimideamide or the like or metal rolls. A pair of metal rolls, a pair of plastic rolls or a pair of a metal roll and a plastic roll can be used. The process temperature is preferably 70–120° C., more preferably 80–100° C. or more. The linear pressure is preferably 200–500 Kg/cm, more preferably 300–400 Kg/cm or more.

The friction coefficient of magnetic recording media of the present invention against SUS420J on the magnetic layer side and the opposite side is preferably 0.1–0.5, more preferably 0.2–0.3, and the surface specific resistance is preferably $10^4$–$10^{12}$ ohms/sq. The modulus of elasticity of magnetic layers at 0.5% elongation in both running and width directions is preferably 100–2000 kg/mm$^2$, and the strength at break is preferably 1–30 kg/cm$^2$. The modulus of elasticity of magnetic recording media in both running and width directions is preferably 100–1500 kg/mm$^2$, the residual elongation is preferably 0.5% or less, and the thermal shrinkage at any temperatures of 100° C. or below is preferably 1% or less, more preferably 0.5% or less, most preferably 0.1% or less, ideally 0%. The glass transition temperature (i.e., the temperature at which the loss elastic modulus of dynamic viscoelasticity measured at 110 Hz is maximum) of magnetic layers is preferably 30° C. or more but 150° C. or less, and that of the lower layer is preferably 0° C. to 100° C. The loss elastic modulus is preferably in the range of $1\times10^8$–$8\times10^9$ dyne/cm$^2$, and the loss tangent is preferably 0.2 or less.

Excessive loss tangents tend to cause adhesion failure. The residual solvent content in magnetic layers is preferably 100 mg/m$^2$ or less, more preferably 10 mg/m$^2$ or less. The residual solvent content in the upper layer is preferably lower than the residual solvent content in the lower layer. The void volume is preferably 30% by volume or less, more preferably 20% by volume or less in both lower and magnetic layers. The void volume is preferably as low as possible to attain high output, but may be preferably more than a specific value for some purposes. For example, higher void volumes are often preferable for better running durability in magnetic recording media for data recording in which repeated use weighs.

The square average roughness RRMS of the magnetic layer determined by the evaluation under atomic force microscopy (AFM) is preferably in the range of 2 nm–15 nm.

The present disclosure relates to the subject matter contained in Japanese Patent Application No. 2000–62191, filed on Mar. 7, 2000, which is expressly incorporated herein by reference in its entirety.

EXAMPLES

The following examples further illustrate the present invention, in which the "parts" mean "parts by weight".

| (1) Nonmagnetic intermediate layer | |
|---|---|
| Nonmagnetic powder α-Fe$_2$O$_3$<br>Major axis length: 0.1 μm<br>Specific surface area (BET): 48 m$^2$/g<br>pH: 8, Fe$_2$O$_3$ content 90% or more<br>DBP oil absorption: 27–38 ml/100 g<br>Surface treating agent: Al$_2$O$_3$. | see Table 2 |
| Carbon black<br>Average primary particle diameter: 16 mμ<br>DBP Oil absorption: 80 ml/100 g<br>PH: 8.0<br>Specific surface area (BET): 250 m$^2$/g<br>Volatile content: 1.5% | see Table 2 |
| Vinyl chloride copolymer<br>(MR-110 manufactured by Nippon Zeon, Co., Ltd.) | 8 parts |
| Polyurethane resin A (see below) | 4 parts |
| Phenylphosphonic acid | 3 parts |
| Butyl stearate | 1 part |
| Stearic acid | 1 part |
| (2) Magnetic layer | |
| Ferromagnetic metal fine powder<br>(see Table 1) | 100 parts |
| Phenylphosphonic acid | 5 parts |
| Polyurethane resin A (see below)<br>(see Binder amount in magnetic layer in Table 2)<br>α-Alumina (particle size 0.18 μm)<br>(see Abrasive amount in Table 2) | |
| Carbon black (particle size 0.08 μm) | 0.5 parts |
| Butyl stearate | 1 part |
| Stearic acid | 3 parts |

Synthesis of Polyurethane Resin A

In a vessel equipped with a reflux condenser and a stirrer and preliminarily purged with nitrogen, hydrogenated bisphenol A, a polypropylene oxide adduct of bisphenol A (molecular weight 700), polypropylene glycol (molecular weight 400) and a sodium salt of bis(2-hydroxyethyl) sulfoisophthalate in the molar ratio of 24:14:10:2 were dissolved in a mixed solvent of cyclohexanone and dimethylacetamide in the weight ratio of 50:50 at 60° C. under a nitrogen stream. As a catalyst, di-n-dibutyltin dilaurate was added in an amount of 60 ppm on the basis of the total amount of the starting materials. Then, MDI (4,4-diphenylmethane diisocyanate) was added in a molar equivalent to the combined diols, and the mixture was heated at 90° C. for 6 hours to give polyurethane resin A of Mw 45000 and Mn 25000 containing 4.0 nmol/g of ether group and 8×10$^{-5}$ mol/g of —SO$_3$Na group.

For preparing the above nonmagnetic coating solution, various components except for lubricants (butyl stearate/ stearic acid) were kneaded in an open kneader and then dispersed with zirconia beads of 1 mm φ using a sand mill. The resulting dispersion was combined with the above lubricants and 3 parts of isocyanate to prepare a solution having a solvent ratio in the coating of methyl ethyl ketone:cyclohexanone=4:6 and a solid content as shown in Table 2. For preparing the above magnetic coating solution, various components except for alumina and lubricants (butyl stearate/stearic acid) were kneaded in an open kneader and then dispersed with zirconia beads of 1 mm φ using a sand mill. An abrasive paste solution containing alumina:vinyl chloride (MR110) cyclohexanone solvent=45/4.5/50.5 was prepared and dispersed with zirconia beads of 1 mm φ using a sand mill separately from the magnetic solution. The magnetic solution and the abrasive paste solution were mixed at a solid content of 31% in the magnetic solution. Then, lubricants and solvents were added to prepare a magnetic solution containing methyl ethyl ketone:cyclohexanone=6:4 and a solid content as shown in Table 2.

Each coating solution was passed through a filter having an average pore diameter of 1 μm to prepare a coating solution.

The resulting coating solutions were applied by simultaneous multilayer coating to form a nonmagnetic layer into a dried thickness of 1.5 μm immediately followed by a magnetic layer into a thickness shown in Table 2 on a polyethylene terephthalate substrate of 5.2 μm having a center-line surface roughness of 0.01 μm (cutoff value 0.25 mm). Both layers still wet were oriented with Co—Sm magnets having a magnetic force shown in Table 3 with two poles (same polarity) facing each other and a solenoid having a magnetic force of 150 mT (1500 G), and dried, and then passed through a 7-stage calender totally consisting of metal rolls at a temperature of 80° C. and slit in a width of ½ inch to prepare a tape.

Evaluation Method (1) Hc and Br were measured with a vibrating sample magnetometer (manufactured by Toei Kogyo Co., Ltd.) at Hm 10 kOe.

(2) A tester with ½-inch fixed heads was used at a tape/head relative speed of 1 m/s. The heads used for measurements were a recording head consisting of an inductive head having a track width of 66 μm and a gap of 1 μm, and a reproducing head consisting of an MR head having a track width of 12.5 μm and a reproducing shield-shield spacing of 0.33 μm. CNR was determined from the ratio between the output at a recording wavelength of 0.55 μm (recording frequency 1.82 MHz) and the integrated noise of the modulation noise spectrum at 0.2–3.6 MHz.

(3) Area ratio of magnetic pinholes (magnetic development defects)

A solution of ferricolloids having an average particle diameter of 0.02–0.03 μm was applied and dried on a tape having a record with said recording head at wavelength 0.55 μm, and then 10 random visions (each having an area of 2.1 μm×1.7 μm=3.57 μm$^2$) were photographed under electron microscopy (SEM) at a magnification of 50,000× and the area bearing no ferricolloid particles was measured to determine the ratio to the test area.

TABLE 1

Magnetic materials

| Characteristics of ferromagnetic metal powder | | A | B |
|---|---|---|---|
| Shape | Particle shape | Flat | → |
| | Particle section | Ellipsoidal | → |
| | Major axis length: μm | 0.06 | 0.10 |
| | Minor axis length: μm (major width) | 0.0155 | 0.021 |
| | Minor width: μm | 0.012 | 0.015 |
| | Crystallite size: A | 115 | 160 |
| | Particle volume: nm$^3$ | 9934 | 27214 |
| Elemental analysis (at %) | SBET (m$^2$/g) | 70 | 55 |
| | Co/Fe | 24 | 29 |
| | Al/Fe | 11.3 | 5.9 |
| | Si/Fe | 0.03 | 0.1 |
| | Y/Fe | 11.2 | 8.3 |
| | Sm/Fe | 0 | 0 |
| | Mg/Fe | 0.7 | 0.7 |
| | Ca/Fe | 0.03 | 0.03 |
| | Na/Fe | 0 | 0. |
| Magnetic properties | Hc (KA/m) | 172 | 195 |
| | σs (A · m$^2$/kg) | 121 | 155 |
| | pH | 9.1 | 9.1 | a highly orientable metal magnetic material B having a particle volume of 25000 nm$^2$ or more.

The area ratio of magnetic development defects is 35%, i.e. exceeds the upper limit of the range defined herein. Electromagnetic characteristics of Examples and Comparative examples were compared with the output and CNR of Comparative example 1 supposed to be 0 dB.

In Example 1, the magnetic layer has an average thickness of 0.066 μm to show an area of magnetic layer defects of 12%, yielding an output of 5.1 dB and C/N of 4 dB. Both were remarkably improved as compared with Comparative example 1.

In Example 2, the magnetic layer was made thinner than that of Example 1 (average thickness 0.036 μm) to lower φr from 0.023 T. μm to 0.012 T. μm. As a result, the output was slightly lowered to 4.6 dB as compared with Example 1, but C/N was 4 dB.

In Example 3, the solid contents and viscosities of the magnetic and nonmagnetic solutions were controlled and the strength of the magnet for initial orientation was lowered as compared with Example 2 to reduce magnetic layer defects to 8%. As a result, the output was slightly improved to 4.8 dB as compared with Example 2, and the C/N was also improved to 4.5 dB.

TABLE 2

Examples/Comparative examples

| | Ex. 1 | Ex. 2 | Ex. 3 | Ex. 4 | Com. ex. 1 | Com. ex. 2 | Com. ex. 3 | Com. Ex. 4 | Com. ex. 5 |
|---|---|---|---|---|---|---|---|---|---|
| Type of magnetic material | A | → | → | → | B | A | → | → | → |
| Amount of abrasives | 10 | → | → | 4.5 | 10 | 10 | 10 | → | 0 |
| Binder amount in magnetic layer | 11 | → | → | 10.45 | 11 | 20 | 11 | → | 10 |
| Volume ratio of magnetic material in magnetic layer | 41.7% | → | → | 44.2% | 41.7 | 34.5% | 41.7% | → | 46.2% |
| Magnetic layer Bm (T) | 0.396 | → | → | 0.42 | 0.53 | 0.336 | 0.396 | — | 0.439 |
| Magnetic layer SQ | 0.87 | 0.84 | 0.86 | 0.87 | 0.90 | 0.84 | 0.87 | — | 0.88 |
| Magnetic layer Hc (KA/m) | 189 | 189 | 189 | 188 | 190 | 191 | 189 | — | 185 |
| Magnetic layer φr(T,μm) | 0.023 | 0.012 | 0.125 | 0.009 | 0.015 | 0.024 | 0.0045 | — | 0.014 |
| Magnetic layer thickness (μm) | 0.066 | 0.036 | 0.036 | 0.025 | 0.031 | 0.085 | 0.013 | 0.1 or less | 0.036 |
| Average number of magnetic particles in the thickness direction | 5 | 3 | 3 | 2 | 2 | 7 | 1 | 1 | 3 |
| Concentration of magnetic solution | 29 | → | 28.5 | 27.8 | 29 | 29 | 27.5 | 29 | 28 |
| Viscosity of magnetic solution shearing: 45000 [1/S] 500 [1/S] | 9 cps 340 cps | → | 8.4 310 | 8 320 | 7.8 240 | 11 200 | 7.4 260 | 9 340 | 8.2 380 |
| Main nonmagnetic powder/carbon charges | 85/15 parts | → | → | 80/20 | 85/15 | → | → | → | → |
| Concentration of nonmagnetic solution | 29.5 | → | 29 | 28 | 29.5 | → | 26 | 32 | 28 |
| Viscosity of nonmagnetic solution shearing: 45000 [1/S] 500 [1/S] | 13 320 | → | 12 280 | 11.5 460 | 13 320 | → | 8.5 90 | 16 450 | 11.5 460 |
| Magnets with two poles facing each other: (T) | 0.3 | → | 0.25 | → | 0.6 | 0.6 | 0.6 | 0.6 | 0.25 |
| Area ratio of magnetic development defects: % | 12 | 14 | 8 | 6 | 35 | 30 | 40 | Magnetic layer not adhered | 0.1 |
| Output (dB) | 5.1 | 4.6 | 4.8 | 4.9 | 0 | 1.6 | −1.5 | — | N.D. |
| CNR (dB) | 4 | 4 | 4.5 | 5 | 0 | 2 | −3 | — | " |
| Saturation of MR head | No | No | No | No | No | No | No | — | " |

N.D. Not detected

Explanation of Examples and Comparative Examples

In Comparative example 1, the thickness of the magnetic layer was reduced to an average thickness of 0.03 μm using In Example 4, the abrasive charges were decreased and the viscosity behavior of each solution was adapted to increase the thixotropy so that magnetic layer defects were further reduced to 6%. As a result, the output was slightly improved to 4.9 dB as compared with Example 3, and the C/N was further improved to 5 dB.

In Comparative example 2, the amount of binders in the magnetic layer was increased and the strength of the magnet for initial orientation was increased similarly to Comparative example 1. The increase of the amount of binders affected the ability of the magnetic layer to be thinner so that the thickness of the magnetic layer can be decreased to only about 0.085 μm. Magnetic layer defects contained defects presumed to be aggregates of binders.

Comparative example 3 used the formulations for magnetic and nonmagnetic layers of Example 3 except that the solid contents of the magnetic and nonmagnetic solutions were lowered and the strength of the magnet for initial orientation was increased similarly to Comparative examples 1 and 2. The lowered concentration of the nonmagnetic solution improved the ability of the magnetic layer to be thinner, but when the thickness of the magnetic layer was reduced to the size corresponding one magnetic particle in the thickness direction of the magnetic layer at said abrasive amount and magnetic solution concentration under high orientation, magnetic layer defects increased and output loss and noise rose. In Comparative example 3 having a magnetic layer solution concentration higher than that of the nonmagnetic concentration, stripes of absence and presence of the magnetic layer occurred in the coating width direction.

In Comparative example 4, the concentration of the nonmagnetic solution was increased to 32% and the magnetic solution of Example 1 was used, with the result that any sample could not be prepared because a magnetic layer of 0.1 μm or less could not be coated.

In Comparative example 5, no abrasive was added. The area of magnetic layer defects decreased to 0.1% in the absence of abrasives and as a result of the lowered strength of the magnet for initial orientation, but electromagnetic characteristics could not be determined because the magnetic layer collapsed during measurement.

According to the present invention, a magnetic recording medium having a relatively thin magnetic layer capable of high-density recording can be provided, which is a particulate magnetic recording medium showing good electromagnetic characteristics in MR heads, especially a good recording/reproducing performance at a short recording wavelength and an excellent productivity.

What is claimed is:

1. A magnetic recording medium comprising a nonmagnetic layer comprising a nonmagnetic powder and a binder and a magnetic layer comprising a ferromagnetic powder and a binder provided in this order on a nonmagnetic substrate wherein said magnetic layer has an average thickness of 0.01–0.1 μm and a ratio of a magnetic recording defects area to a total magnetic recording area is in the range of from 0.2 to 20% in a case recording is made at the shortest wavelength in a recording system.

2. The magnetic recording medium according to claim 1, wherein said magnetic recording defects area is recognizable upon magnetic development.

3. The magnetic recording medium according to claim 1, wherein said ratio is in the range of from 0.5 to 15%.

4. The magnetic recording medium according to claim 1, wherein said ratio is in the range of from 0.5 to 10%.

5. The magnetic recording medium according to claim 1, wherein said ferromagnetic powder is a ferromagnetic metal alloy powder having a major axis length equal to or less than 0.1 μm and an average particle volume equal to or less than 25000 $nm^3$.

6. The magnetic recording medium according to claim 5, wherein said major axis length of the ferromagnetic metal alloy powder ranges from 0.04 to 0.1 μm.

7. The magnetic recording medium according to claim 5, wherein said major axis length of the ferromagnetic metal alloy powder ranges from 0.04 to 0.08 μm.

8. The magnetic recording medium according to claim 5, wherein said average particle volume of the ferromagnetic metal alloy powder is equal to or less than 12000 $nm^3$.

9. The magnetic recording medium according to claim 1, which is a particulate medium for high-density recording/reproducing at a bit area equal to or less than 3.5 $\mu m^2$.

10. The magnetic recording medium according to claim 1, wherein said thickness of the magnetic layer is selected within the range that residual magnetic flux φr is in the range of 50–250 G.μm.

11. The magnetic recording medium according to claim 1, wherein said magnetic layer has a magnetic flux density Bm in the range of 0.2–0.6 T.

12. The magnetic recording medium according to claim 1, wherein said magnetic layer has a magnetic flux density Bm in the range of 0.25–0.5 T.

13. The magnetic recording medium according to claim 1, wherein said magnetic layer has a squareness SQ in the range of 0.7–0.95.

14. The magnetic recording medium according to claim 1, wherein said magnetic layer has a squareness SQ in the range of 0.8–0.95.

15. The magnetic recording medium according to claim 1, wherein said magnetic layer has a residual magnetic flux density Br in the range of 0.15–0.55 T.

16. The magnetic recording medium according to claim 1, wherein said magnetic layer has a residual magnetic flux density Br in the range of 0.2–0.45 T.

17. The magnetic recording medium according to claim 1, wherein said magnetic layer has a coercivity Hc in the range of 143–239 KA/m.

18. The magnetic recording medium according to claim 1, wherein said magnetic layer has a coercivity Hc in the range of 159–223 KA/m.

* * * * *